March 28, 1961 T. F. MURPHY ET AL 2,976,949
APPARATUS FOR CLEANING AND PURIFYING
GASEOUS PRODUCTS OF COMBUSTION
Filed Oct. 8, 1956 2 Sheets-Sheet 1

INVENTORS
THOMAS F. MURPHY
JAMES M. HORN
BY
Morgan, Finnegan, Durham & Pine
ATTORNEYS

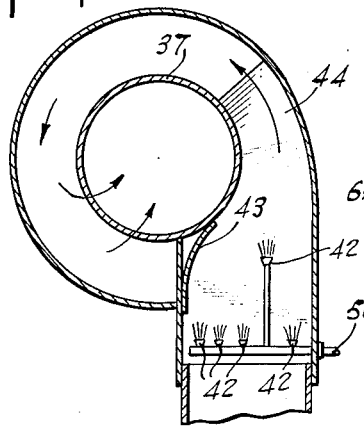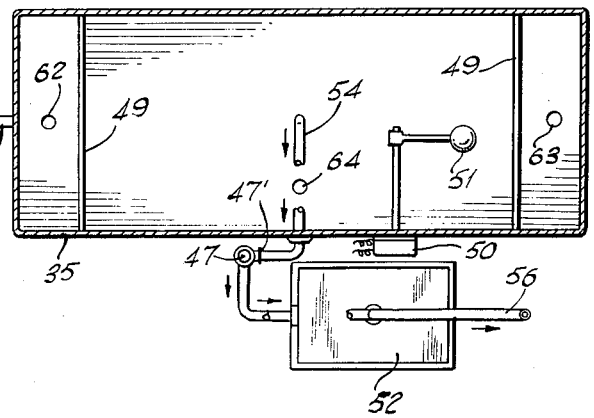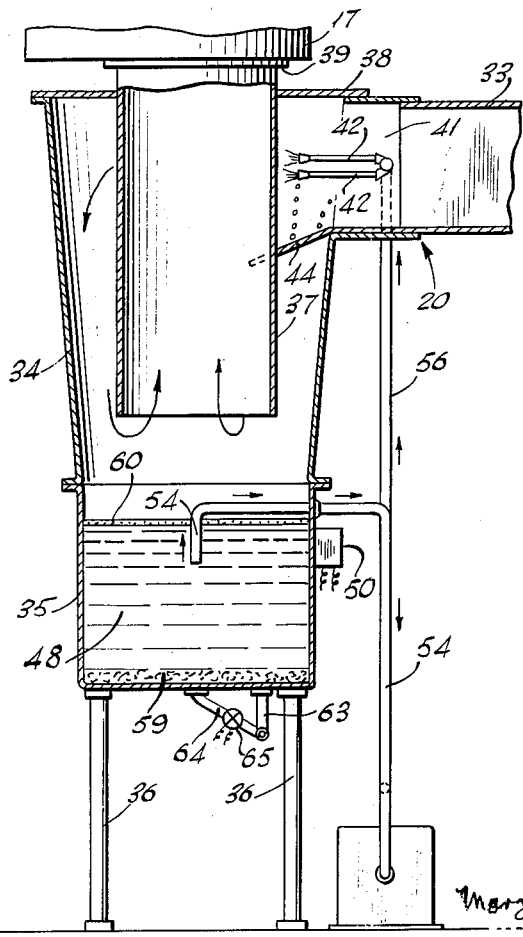

United States Patent Office 2,976,949
Patented Mar. 28, 1961

2,976,949

APPARATUS FOR CLEANING AND PURIFYING GASEOUS PRODUCTS OF COMBUSTION

Thomas F. Murphy, Howard Beach, and James M. Horn, New York, N.Y., assignors to J. L. Murphy, Inc., New York, N.Y., a corporation of New York Filed Oct. 8, 1956, Ser. No. 614,646

6 Claims. (Cl. 183—3)

This invention relates to the cleaning and purification of gaseous products of combustion and more specifically to a novel and improved apparatus for cleaning smoke and removing combustible and other matter therefrom before discharge into the atmosphere. While the invention is of general utility, it is particularly effective for cleaning and purifying smoke from incinerators and other similar devices.

The purification or cleaning of gaseous products of combustion to eliminate smoke and fly ash has presented a serious problem. For example, known devices are relatively costly to maintain and operate, particularly in applications involving incinerators and similar equipment wherein exceptionally large amounts of fly ash is discharged along with a considerable quantity of unburned paper. Accordingly one object of the invention resides in the provision of a novel and improved apparatus for smoke control that is particularly effective for purifying and cleaning incinerator combustion products and that is characterized by its effectiveness in removing solid products of combustion and its relatively low operating cost and ease of maintenance. Through an improved arrangement and combination of elements liquid requirements for scrubbing are maintained at a minimum and all combustible materials are reduced to ash so that uninterrupted operation can be maintained for extended periods of time.

Another object of the invention resides in the provision of an improved system for smoke control embodying a liquid scrubber wherein the quantity of liquid required is maintained at a minimum and the products removed from the gases of combustion during the scrubbing operation are periodically and automatically discharged from the apparatus without interrupting the operation thereof.

Still another object of the invention resides in the provision of improved smoke cleaning and purifying apparatus for removing fly ash and unburned material from the gases to be discharged and at the same time completing the burning of unburned products to maintain the trash accumulation at a minimum and thereby avoid frequent interruption of operation for removal thereof. Moreover through the novel arrangement of elements part of the fly ash and ash from burned trash may be re-introduced into the gas flow and removed automatically by the liquid scrubbing apparatus.

A further object of the invention is a novel and improved device for cleaning and purifying gaseous products of cumbustion.

The above and other objects of the invention will become more apparent from the following description and accompanying drawings forming part of this application.

Figure 2:
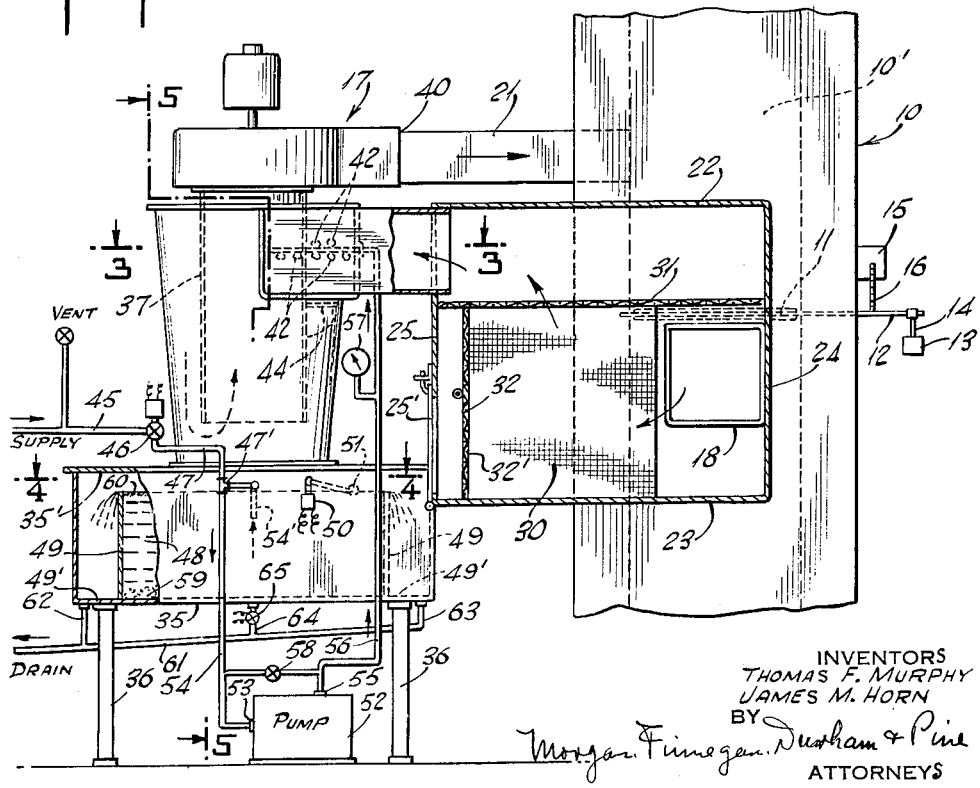
Figure 2 is a cross sectional view of Figure 1 taken along the line 2—2 thereof with certain portions of the apparatus broken away to illustrate structural details thereof.

Figure 3 is a cross sectional view of Figure 2 taken along the line 3—3 thereof; and Figures 4 and 5 are cross sectional views of Figure 2 taken along the line 4—4 and 5—5.

For the present purposes the invention is shown as being connected with the stack of a furnace, incinerator or other similar piece of equipment, or removing smoke and other products of combustion from the stack, purifying and cleaning the gases and returning them to the stack or other conduit for discharge to the atmosphere.

One of the more important applications of the invention involves incinerators as their gaseous products of combustion usually carry with them unburned matter such as paper and the like and it is important to remove and dispose of such matter in addition to scrubbing the smaller particles of solid matter also carried by the hot gases produced through combustion. This invention as will be described provides among other things a novel and improved arrangement not only for the collection of unburned material but also the burning of this material after collection to reduce the frequency of cleaning and maintenance operations. In addition the invention further provides an improved water scrubbing system that utilizes a limited supply of water and at the same time provides for automatic disposal of the sludge collected from the combustion gases.

More specifically and with reference to the figures, 10 denotes the flue or stack of a furnace, incinerator, or other similar device and 10′ denotes the centrol opening through which the hot gases of combustion are discharged. While the invention is shown and described in connection with its application to a stack, it is to be understood that it may be disposed at any point in the stack or in conduits connecting the furnace with the stack or in conduits connecting any point in the stack to the outside air.

Figure 1:
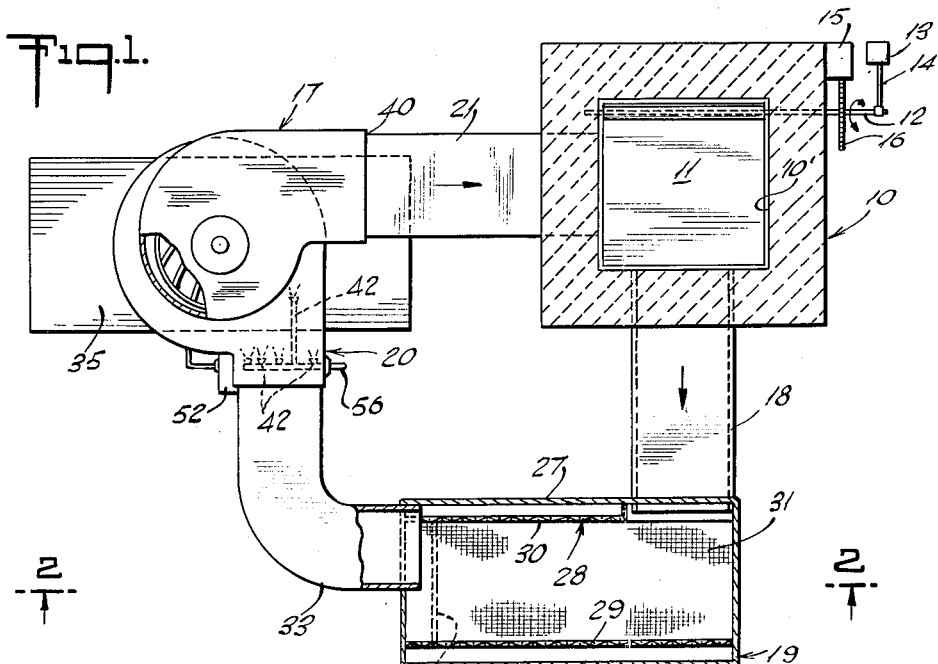
Figure 1 is a plan view in partial section of one embodiment of the invention.

The stack 10 is provided with a damper 11 carried by a transverse shaft 12 rotatably supported along one edge of the opening 10′. The damper 11 may be formed of a solid piece of sheet metal or other suitable material and is fixedly mounted to the shaft 12 so that it may be moved from a closed position as shown in Figure 1 to an open position lying flat against the wall of the stack opening 10′. The damper 11 is counter weighted by a weight 13 attached to the shaft 12 by an intervening bracket member 14. In the normal operation of the invention, the damper 11 is maintained in the closed position as shown in Figure 1 and will remain in this position as long as the pressure on the furnace side of the damper is normally negative. This negative pressure is produced by the centrifugal fan generally denoted by the numeral 17. Should the pressure on the furnace side of the damper exceed atmospheric pressure at any time, the damper 11 will move upwardly about the shaft 12 to relieve this pressure and then return to its normal closed position. This automatic action is achieved by proper balance of weight 13 against the damper 11. Its purpose is to prevent positive pressure occurring in the stack. In the case of incinerators utilizing hopper doors in the stack, the automatic damper action prevents smoke, embers and ash from issuing into the building. A special damper motor 15 may be connected to shaft 12 by a chain 16 or other flexible connection to pull the damper to a full open position against the wall of the chimney when the fan is not running and to permit the damper to close when the fan starts.

The fan 17 withdraws the combustion products from the stack 10 through a conduit 18 communicating with the stack at a point below or on the furnace side of the damper 11. The fan 17 withdraws the combustion products from the stack 10 through a conduit 18 communicating with the stack at a point below or on the furnace side of the damper 11. The gases then pass through a trap 19 for the collection and burning of paper and other relatively large burned and unburned pieces of material, and a water scrubber 20 whereupon the cleaned gases are returned to the stack through a conduit 21 communicating with the opening 10' at a point above the damper 11.

The trap 19 in the illustrated embodiment of the invention includes an outer housing of metal or other suitable material of rectangular configuration having top and bottom walls 22 and 23, end walls 24 and 25 and side walls 26 and 27. The side wall 23 has an opening therein to receive the outer end of the conduit or pipe 18 through which gases from the stack are admitted to the trap 19. Within the trap 19, there is a wire basket or enclosure 28 also of rectangular configuration and having the side, top and end walls 29, 30, 31 and 32 spaced from the adjoining walls 26, 27, 22 and 25 of the housing.

The combustion products enter the screened enclosure 28 through conduit 18 and unburned paper, embers and the like carried by the hot gases are trapped and retained within the screen. The gases then pass through the walls of the screen enclosure and outwardly through an L-shaped conduit 33. The inlet and outlet openings of the trap 19 are preferably disposed at opposite ends of the trap housing so that the hot gases will be conducted past the screened out waste to dry it to a tinder state and ignite it by sparks or burning embers carried by the gases. By utilizing the trap 19 in the first step of the cleaning process, paper and other combustible materials trapped within the screened enclosure 28 will be constantly burned so that the rate of accumulation will be slow.

In order to clean the screened enclosure the wall 25 of the trap housing is provided with a door 25' and the screened enclosure includes a corresponding openable part 32' in the wall 32. By reason of the arrangement and organization of elements in accordance with the invention the apparatus need not be inactivated during this cleaning period as the suction applied to the stack through the conduit 18 will only be partially reduced when the doors 25' and 32' are opened.

While the major part of the material accumulated within the screened enclosure will be retained therein, the turbulence produced by the flow of gases therethrough will tend to break up fly ash and carry it through the screening thus reducing the rate of accumulation of ash within the enclosure. The screened gases upon leaving the trap 19 flow through the conduit 33 connecting the trap with the water scrubbing system 20.

The water scrubber 20 includes an inverted conical housing 34 secured at the lower end to a water tank 35 to form a complete enclosure and the water tank 35 together with the housing 34 are supported by suitable legs 36. A cylindrical member 37 is disposed within the housing 34 and extends from a point spaced from the bottom thereof upwardly through the housing cover 38. The upper end of this tubular member 37 is connected with the suction inlet 39 of the centrifugal fan 17. The outlet 40 of the fan is connected to the stack 10 as previously discussed by means of conduit 21.

The combustion gases enter the scrubber housing 34 tangentially and move through a helical path about the inside of the cylindrical member 37 and are ultimately drawn upwardly through the center of the member 37 whereupon they are discharged into the stack. Scrubbing of the hot gases is accomplished by a plurality of water nozzles 42 that emit a fine spray of water into the flow of the incoming gases. In order to insure movement of the gases in a helical motion and thereby cause the relatively heavy particles of matter to be thrown outwardly against the wall of housing 34 along with the water emitted by the nozzles, the gases and water are guided in their initial motion by a vertical baffle 43 as will be observed in Figure 3 and a horizontal baffle 44 that curves downwardly and about the central member 37 as may be observed in Figures 3 and 5. The dust particles adhere to the water particles with which they are brought into contact and are thus removed and carried into tank 35.

The water tank 35 embodies a novel and improved arrangement of elements to reduce water requirements through recirculation of water from the tank 35 and to the nozzles 42 and at the same time automatically remove the sludge collected within the tank 35. This improved water circulation and filtering system is shown in Figures 2, 4 and 5.

The water supply for the scrubbing system enters the tank 35 through an inlet conduit 45, an electrically operated valve 46 and a second inlet conduit 47 connected at 47' with a conduit 54 terminating at 54' beneath the surface of the water reservoir 48. The water reservoir is formed within the tank 35 by a pair of weir plates 49 that are secured to the bottom and side walls of the tank 35 and spaced from the end walls and top wall thereof. Thus the surface of the water reservoir 48 is maintained at a point below the top wall 35' of the tank 35. Water is admitted into the tank area defined by the weir plates 49 until it reaches a level defined by the top of the weir plates 49 whereupon a float switch and float 50 and 51 electrically connected with the solenoid valve 46 operates to cut off the water supply.

The water from the reservoir 48 is supplied to the nozzles 42 by means of a suitable pump generally denoted by the numeral 52. The inlet 53 of the pump withdraws water from the reservoir 48 by means of a conduit 54 with the end 54' of the conduit 54 terminating at a point well below the level of the liquid so that dirt settling on the bottom or floating on the top of the water will not be recirculated by the pump. While the water inlet conduit 47 need not be directly coupled to the conduit 54 connected with the pump 52, it is preferable to couple these conduits so that fresh inlet water will be immediately circulated through the nozzles. Furthermore, the admission of water through the suction opening 54' prevents accumulation of dirt about the opening caused by the falling or rising surface of the tank water when the tank is periodically drained to remove dirt that has settled to the bottom.

The outlet 55 of the pump 52 is coupled to the nozzles by means of a conduit 56 and a pressure gauge 57 may be provided in order to monitor the water pressure applied to the nozzles. In order to control the outlet pressure of the pump, a valved bypass generally denoted by the numeral 58 may be provided between the inlet and outlet conduits 54 and 56, respectively.

With the arrangement as described above the matter scrubbed from the combustion gases will be collected within the reservoir 48. A small amount will settle out as a sediment generally denoted by the numeral 59 while most will float as a sludge on the surface of the water as denoted by the numeral 60. As the material 60 collects on the surface of the water it will from time to time flow over the weir plates 59 and drain off into the sewer system through chambers 49'. The overflow which carries away the floating sludge is accomplished by the rotary centrifugal motion of the gases and surface water as the water level rises close to the weir level when the float switch 50 opens the solenoid valve to supply additional water.

In alternate methods of operation, the float switch is omitted and a small flow of fresh water is provided into the system either continuously or, by time switch and solenoid valve, for periodic intervals causing an overflow from the central reservoir into the chambers 49' and the drains 62 and 63. Aided by the rotary centrifugal motion of the gases and the surface water, the flow carries off all surface sludge as it is deposited by the water descending from the sprays, as well as any that has accumulated between the intervals of overflow. The dirt or sludge collected in the chambers 49' is constantly discharged through the drains 62 and 63 connected with a common drain 61. The sediment in the bottom of the tank 35 between the weir plates 49 is discharged through a drain 64 connected to conduit 61. Draining of the tank 35 is controlled by an electrically operated valve generally denoted by the numeral 65. While the tank may be drained periodically it is preferable to do so when the equipment is not in operation. In draining the tank 35, valve 65 is opened until the water in the reservoir has drained out. As the water level drops the float switch 50, 51 functions to open valve 46 to let fresh water flow into the reservoir. After all of the dirty water has been removed valve 65 is closed and the reservoir is automatically filled with fresh water.

The apparatus as described above affords a number of important and significant advantages. The first of these resides in the nature and construction of the trap 19 which removes large particles of matter and unburned paper from the flue gases. Since the screen enclosure 28 is spaced from the walls of the trap housing this material can burn within the screen area and will not unduly heat the walls of the housing above the normal temperature of the flue gases. In addition the water scrubbing system 21 is disposed after the trap 19 and is arranged to impart circular motion to the water spray as well as to the gases being scrubbed. As a result of the rotary motion imparted both to the water as well as to the gases, the return of the water into the reservoir 48 will impart rotary motion to the reservoir and this action tends to carry the sludge ouwardly of the center and thus leave the water in the center of the reservoir relatively clean for withdrawal by the suction pump 52. Inasmuch as the sludge deposits 59 and 60 is periodically and automatically withdrawn from the tank 35 as previously described the only regular maintenance required in the operation of the system is to remove the burned residue within the trap 19.

While only one embodiment of the invention has been shown and described, it is apparent that other modifications, alterations and changes may be made without departing from the true scope and spirit thereof.

What is claimed is:

1. In apparatus for cleaning and purifying gaseous products of combustion, screening means for removing relatively large pieces of material comprising an outer housing having an inlet and outlet therein and an inner screen enclosure communicating with said inlet, said inlet, outlet and screen enclosure being arranged to facilitate ignition of the screenings and water scrubbing means including a vertically disposed tubular housing, a vertically disposed tubular member within said housing, blower means having its inlet coupled with the last said inner tubular member, a water reservoir beneath and joined to said tubular housing, said reservoir having at least one overflow compartment and having an area at least equivalent to the area of the lower end of said housing and centered thereunder, a weir plate between said reservoir and overflow compartment, a water inlet for said reservoir, a gas conduit connected at one end to the outlet of said screening means and tangentially connected at the other end to the upper part of said housing to produce circular motion of the gases between the housing and said inner tubular member and discharge said gases upwardly through said inner member, said gases imparting rotary motion to the water and sludge in the reservoir, water nozzle for directing a tangential spray within said housing, the water following a spiral path downwardly into said reservoir, water pumping means for delivering water from the center of said reservoir to said nozzles, said water removing matter from said gases and depositing it in said reservoir with the matter accumulating on the surface of the water therein being discharged over said weir plate into the overflow compartment and the matter heavier than water settling to the bottom, and drains connected with each compartment for removing said matter.

2. An apparatus for cleaning and purifying gaseous proucts of combustion comprising conduit means leading tangentially into an outer housing of circular cross section, said conduit having disposed therein a means for retaining, and comminuting solid combustible materials, said retaining and comminuting means being arranged to facilitate ignition of the solid combustible material, said conduit means also being provided with at least one spray nozzle, an inner housing disposed within said outer housing and provided with an exhaust means for aiding in the removal of the combustion gases introduced therein, a reservoir vessel disposed below the terminus of the lower edge of the outer housing said reservoir vessel being disposed within a larger vessel, means for removing sludge from the reservoir vessel and means for removing overflowed solids from the larger vessel.

3. An apparatus as set forth in claim 2 wherein there is provided means for recycling water from the reservoir to the spray nozzle.

4. An apparatus as set forth in claim 2 wherein means are provided for raising or lowering the water level in the reservoir.

5. An apparatus as set forth in claim 2 wherein the outer housing has the form of an inverted conic section.

6. An apparatus as set forth in claim 2 wherein the retaining means is a screen enclosure including top, bottom, side and end walls positioned in spaced relation to said conduit.

References Cited in the file of this patent

UNITED STATES PATENTS

| | | |
|---|---|---|
| 839,797 | Wood | Dec. 25, 1906 |
| 2,208,673 | Hopkins | July 23, 1940 |
| 2,346,022 | Gonia | Apr. 4, 1944 |
| 2,484,277 | Fisher | Oct. 11, 1949 |
| 2,575,359 | Ortgies | Nov. 20, 1951 |
| 2,585,440 | Collins | Feb. 12, 1952 |
| 2,588,106 | Frangquist | Mar. 4, 1952 |
| 2,653,674 | Ortgies | Sept. 29, 1953 |
| 2,668,754 | Lichtenfels | Feb. 9, 1954 |
| 2,678,616 | Kay | May 18, 1954 |
| 2,803,309 | Baker | Aug. 20, 1957 |